J. W. MACKINTIRE.
Horse Stall.

No. 34,152.

Patented Jan. 14, 1862.

Witnesses
James Mackintire
F. R. Hale Jr.

Inventor
James W. Mackintire

UNITED STATES PATENT OFFICE.

JAMES W. MACKINTIRE, OF WOBURN, MASSACHUSETTS.

IMPROVEMENT IN STALLS FOR HORSES.

Specification forming part of Letters Patent No. 34,152, dated January 14, 1862.

*To all whom it may concern:*

Be it known that I, JAMES W. MACKINTIRE, of Woburn, in the county of Middlesex and State of Massachusetts, have invented a new and useful Improvement in Stalls for Horses; and I do hereby declare the same to be fully described in the following specification and represented in the accompanying drawings, in which—

Figure 1:
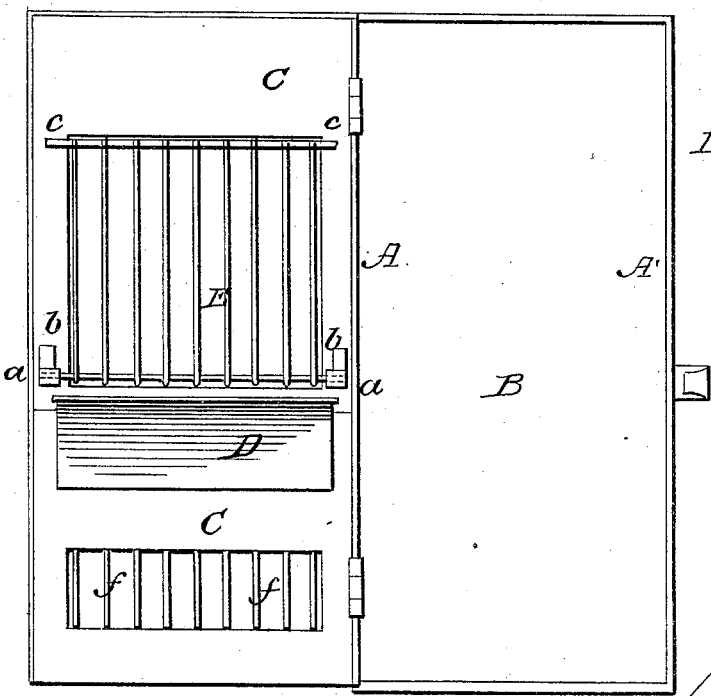
Figure 2:
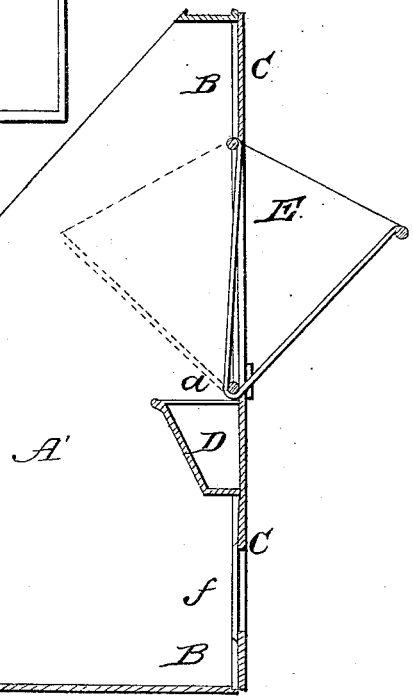

Figure 1 denotes a front elevation of a stall as provided with my invention, the same showing the door as opened or in position to allow a horse to be led out of the stall. Fig. 2 is a longitudinal section of the stall with the door closed, the same showing in red lines the position of the rack when turned inward.

It is a fact well known that the ordinary construction of stalls for horses is defective in several important respects. In the first place, their construction and arrangement have been such as to cut off a circulation of pure air from the horses. In the second place, it was very difficult, as well as dangerous, to pass into the stall to a vicious horse. In the usual construction of stalls the front parts are made stationary and arranged on the sides or ends of a stable or building, so that the horse stood with his rear parts toward the middle of the floor or passage-way, whereby his excrements were deposited between the said floor or passage-way and the head of the animal. The noxious gases arising from the same were carried forward by the inrushing air (which is borne directly over them) and escaped through the hay into the opening above the rack.

In the construction of my improved stall I make the same of joists and boards or any suitable material, but I so arrange the stall that the head of the horse shall be facing the middle of the floor or passage-way.

In the drawings, A A' denote the sides of the stall. In the front part thereof I make an opening B, which I provide with a door C, hinged to the side of the part A, as seen in Fig. 1.

D is a feed-box, which is arranged on the inside of the door and just below the bottom of the rack E. This rack I construct of a V shape in transverse section and form on the lower part thereof journals $a\ a$, which are supported in bearings $b\ b$, so as to allow the rack to be turned either forward or backward, as circumstances may require. For the purpose of maintaining the rack in either its forward or rearward position I form four projections on the top corners of the rack, two of which—viz., $c\ c$—are seen in Fig. 1. Below the said crib or feed-box D, I form an opening G, which I supply with bars $f\ f\ f$. The object of this opening is to supply the horse with pure air while lying down.

By my peculiar construction of the front part of the stall—viz., with an opening through the same and provided with a door, as set forth—a person is able to approach the horse at his head without being obliged to go behind him and pass by him into the stall, and besides, when desirable, the animal can be led through the doorway and has not to be backed out in the usual manner.

Another advantage my invention possesses is that the pure air flowing into the stable passes directly in contact with the head of the animal without being impregnated with noxious gases arising from his own excrements.

Another advantage my invention has is that the rack can readily be moved backward into a vertical position, so as to give a free unobstructed space in the passage-way, while also it allows the door to be swung entirely back against another stall, so as to allow free egress for the horse.

A simple modification of my invention would be to make the door slide on ways instead of being hinged, as set forth.

Having described my invention, what I claim, and desire to secure by Letters Patent, is—

1. My improved stall, as constructed with the opening B, the door C, and the rack E, applied and made to operate together, substantially in manner as set forth.

2. The V-shaped rack arranged and made to operate in manner as set forth.

JAMES W. MACKINTIRE.

Witnesses:
   F. P. HALE, Jr.,
   JAMES MACKINTIRE.